US006529287B1

United States Patent
Wang et al.

(10) Patent No.: US 6,529,287 B1
(45) Date of Patent: Mar. 4, 2003

(54) IMAGE PROCESSING SYSTEM

(75) Inventors: Po-Chih Wang, Taichung; Chung-Yi Yao; Thomas Sheng, both of Hsin-Chu; Yen-Cheng Chen, Hsin-Chu, all of (TW)

(73) Assignee: Avision Inc., Hsin-Chu (TW)

( * ) Notice: Subject to any disclaimer, the term of this patent is extended or adjusted under 35 U.S.C. 154(b) by 0 days.

(21) Appl. No.: 08/859,278

(22) Filed: May 19, 1997

Related U.S. Application Data

(62) Division of application No. 08/595,028, filed on Jan. 31, 1996.

(51) Int. Cl.[7] .................................................. G06F 15/00
(52) U.S. Cl. ...................................... 358/1.15; 358/1.9
(58) Field of Search ............................... 395/114, 112, 395/101, 106, 109, 115, 116; 358/442, 468, 448, 456, 457, 458, 459, 534, 518, 519, 536, 298, 302, 455, 447, 404, 444, 434, 532, 462, 443, 466

(56) References Cited

U.S. PATENT DOCUMENTS

| 4,885,223 A | * | 12/1989 | Enoki et al. ................. 399/354 |
| 4,935,821 A | * | 6/1990 | Sano et al. ................... 358/427 |
| 4,989,163 A | * | 1/1991 | Kawamata et al. .......... 395/112 |
| 5,014,333 A | * | 5/1991 | Miller et al. ................. 358/443 |
| 5,177,623 A | * | 1/1993 | Hirota .......................... 358/457 |
| 5,235,674 A | * | 8/1993 | Cohen-Skalli et al. ...... 395/101 |
| 5,425,135 A | * | 6/1995 | Motoyama et al. .......... 395/114 |
| 5,532,844 A | * | 7/1996 | Kagami et al. .............. 358/468 |
| 5,572,337 A | * | 11/1996 | Kajitani et al. .............. 358/464 |

* cited by examiner

Primary Examiner—Gabriel Garcia
(74) Attorney, Agent, or Firm—H. C. Lin

(57) ABSTRACT

An image processing system integrates the scanning function with image processing function. The scanned image can be directly transmitted to a printer for high quality reproduction to serve a "scan to print" function. The system can also transmit the scanned image with or without being processed to a computer for further processing. The output from the computer can be transformed into image for rapid printout.

23 Claims, 7 Drawing Sheets

IMAGE PROCESSING SYSTEM

This application is a continuation of application Ser. No. 08/595,028, filed Jan. 31, 1996.

This invention relates to an image processing system for digital printer in conjunction with a scanner or document reader to serve as a copier.

BACKGROUND OF THE INVENTION

Due to the popularity of office automation, it is common practice to equip an office or home with a scanner and a printer as shown in FIG. 1. (Note that the word "scanner" may also be termed as "image reader", "image inputting device" or "document reader".) On the other hand, a digital copier is a bulky and expensive piece of equipment. It is desirable to reduce the number of equipment in an office or home to economize on space, expense and energy consumption.

A digital copier is actually a combination of a scanning device, a printing device and an image processor. As shown in FIG. 2, a digital copier consists of a scanning unit 101, a system control unit 102, an image processing unit 103, a printing unit 104 and an operation panel 105. Generally, the scanning unit 101 uses a charge coupled device (CCD) image sensor or contact image sensor (CIS) to scan the images of a document for each narrow region, i.e. on a pixel basis, to produce an analog image signal. The analog signal is quantized and converted into digital signals. After various kinds of signal processing in the image processing unit 103, the digital signal is applied to the printing unit 104 to reproduce the document images. The operation panel 105 is used to select various image processing methods and copy count.

The advantages of such a digital copier is having image manipulation capability and better printout quality compared with conventional low-end and mid-end copier. The drawback is its expense and bulkiness.

It can be seen that the function of a digital copier is redundant with that of a scanner and a printer. The processing and programming of a digital copier is similar to that of a scanner plus an image processing system and a printer.

At present, a printer is customarily used in connection with a personal computer. Data are transferred through an interface driver, such as the Centronics Interface. Due to the limitation of transmission speed and image processing of huge amount of data, it is not possible to increase the printing speed. Without any special image processing device, or real time image processing system or algorithm, the printer is incapable of achieving high quality and high speed printing.

According to a conventional method of binarized gradation processing an image by way of dither, the image signal read is directly compared as an analog signal with a dither threshold value or after it has been converted to the digital signal. This digital signal is compared with the dither threshold value and in this case, the dither threshold value is two-dimensionally changed in correspondence to the division of the read image. However, an image processed with the dither method results in poor resolution with saw-tooth edge in text and with Moire pattern.

SUMMARY

The objects of this invention are to combine the functions of a scanner, a computer and a printer and to effect the following provisions:

1. A provision to store the scanned image input in the image processor, and to output directly the stored image rapidly to the printer;
2. A provision to translate the stored image and then to output the stored image rapidly to the printer;
3. A provision to output the stored image to a computer for storage;
4. A provision to translate the stored image and then to output the translated image to a computer;
5. A provision to output the scanned image input directly to a computer without image processing;
6. A provision to view the stored image in the computer and to output rapidly to the printer;
7. A provision to view or to edit the stored image, to view again after image processing, and then to output rapidly to the printer;
8. A provision to first transform the information in the computer into image, and then to output the information rapidly to the printer;
9. A provision to connect a video interface with a printer to fully utilize the high speed capability of the printer.

These objects are achieved by integrating the scanning function and the image processing function as an "image processing system". The scanned image can be directly transmitted to a printing device for high quality reproduction serving a "scan to print" function. This invention can also transmit the scanned image with or without processing to a computer for further processing. The output from the computer is transformed into image information for rapid printout,

DETAILED DESCRIPTION OF THE PREFERRED EMBODIMENT

This invention comprises the following features:

a scanning equipment to furnish scanning input data;

an interface connected to a printer;

a controller, which controls, processes and outputs gray and color information from the scanner to the printing device, and synchronizes the input image with the output image for minimizing the required storage capacity;

a clock generator to generate clock pulse and control timing for the image processing system;

an operating panel to manipulate input keys;

an indicating device to indicate: operation or current status, printing selection, print density, etc.

Also included in the system is a provision to implement the "error diffusion method" for overcoming the drawback of the "dither method". Image correction, edge emphasis, "decision making method", etc. are used to improve the quality of the image printout.

Figure 1:
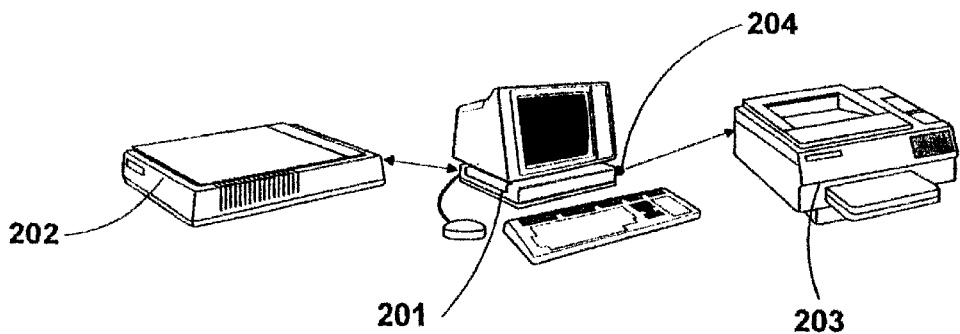
FIG. 1 shows a conventional office computer setup including a scanner and a printer.
Figure 2:
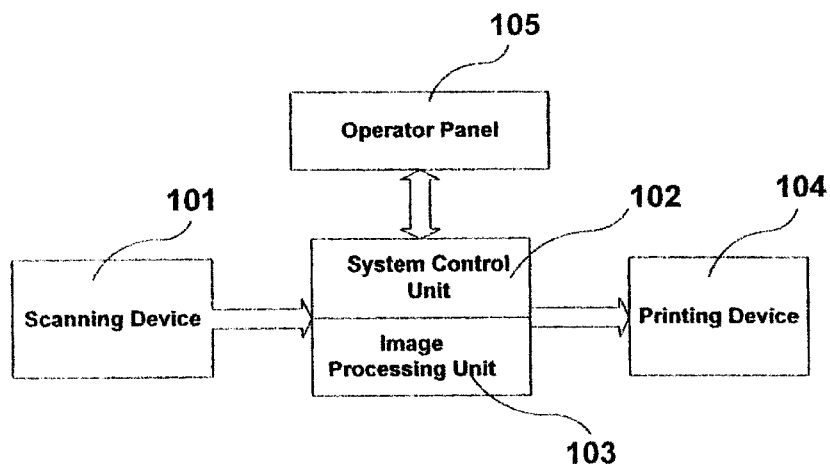
FIG. 2 shows the block diagram of a conventional setup of a digital copier.
Figure 3:
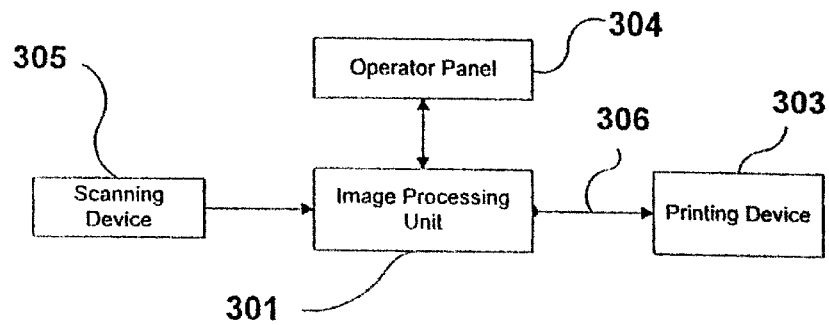
FIG. 3 shows the basic system of the present invention, combining scanning and image processing, and outputting to a printing setup to function as a digital copier.

Referring to FIG. 3, this invention integrates the scanning and image processing functions and outputs to the printing device to effect digital printout. The complete system includes: a scanning device 305, image processing device 301, operation panel 304, printing interface 306 and printing device 303.

When a colored or black-and-white document is scanned by the scanner 305, there are many levels of image signals. These multiple level signals are processed by an image processor 301 or by an "Application Specific Integrated Circuit, ASIC". According to the user's selection through the operating panel, gray level image information can be produced.

The signal from the scanning device 305 is fed to the image processor 301, which obtains the user's chosen information from operation panel 304 for the selection of processing mode and the quantity number of copies, and combines with the output from the scanner 305. The combined signal is processed in the image processor, and fed to a printer or printing Device (such as a printing engine) 303 via a video printing interface 306. The printing device 303 modulates the received video image signal into laser beam and reproduces the image.

Figure 4:
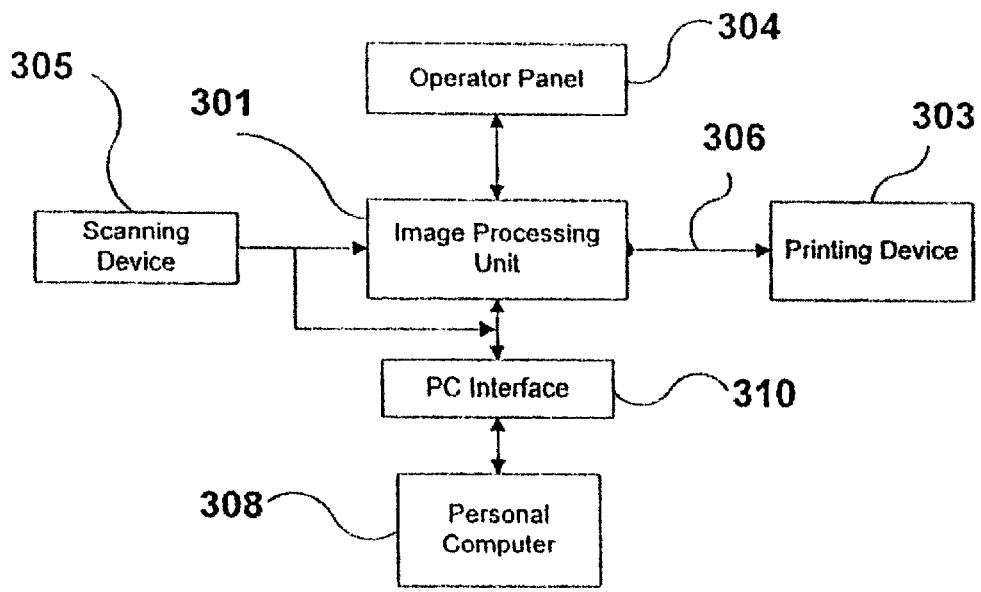
FIG. 4 shows the block diagram to transmit the scanned image to a computer through a computer interface. Alternatively, the scanned image, after image processing, can be transmitted to the computer.

Referring to FIG. 4, through the computer interface 310, the scanned image can be transmitted to the computer 308 without passing through the image processor 301. The scanned image can also elect to go through the image processor 301 before transmitting to the computer 308. Whenever the computer outputs any information, the information is converted into image signal through the image processor 301.

Figure 5:
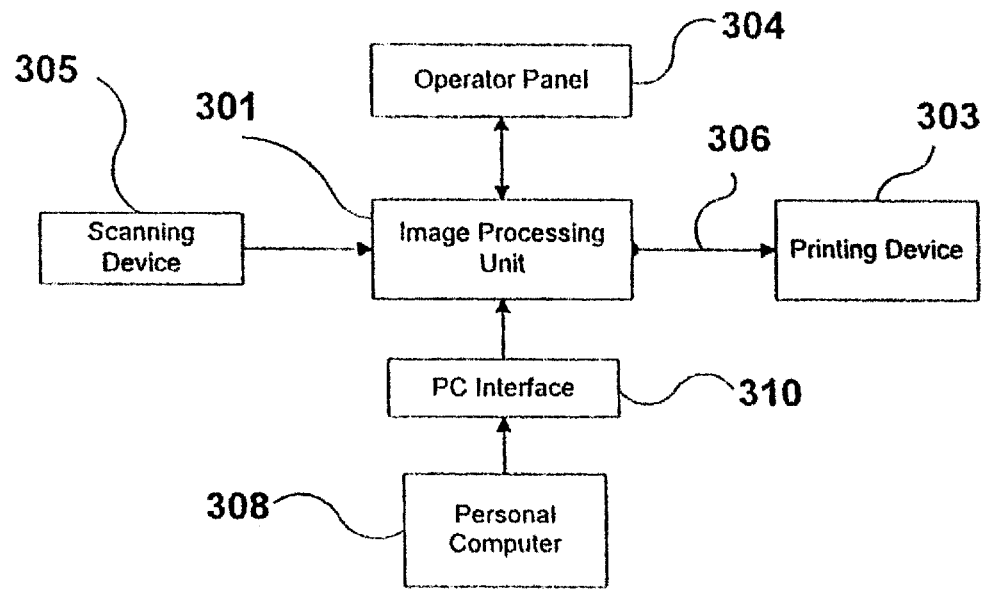
FIG. 5 shows a block diagram for a computer interface to transmit printing information to the printing device through the image processor with or without being processed by the image processor.

Referring to FIG. 5, the printing information is transmitted to the printer 303 through the computer interface 310 and the image processor 301.

Figure 6:
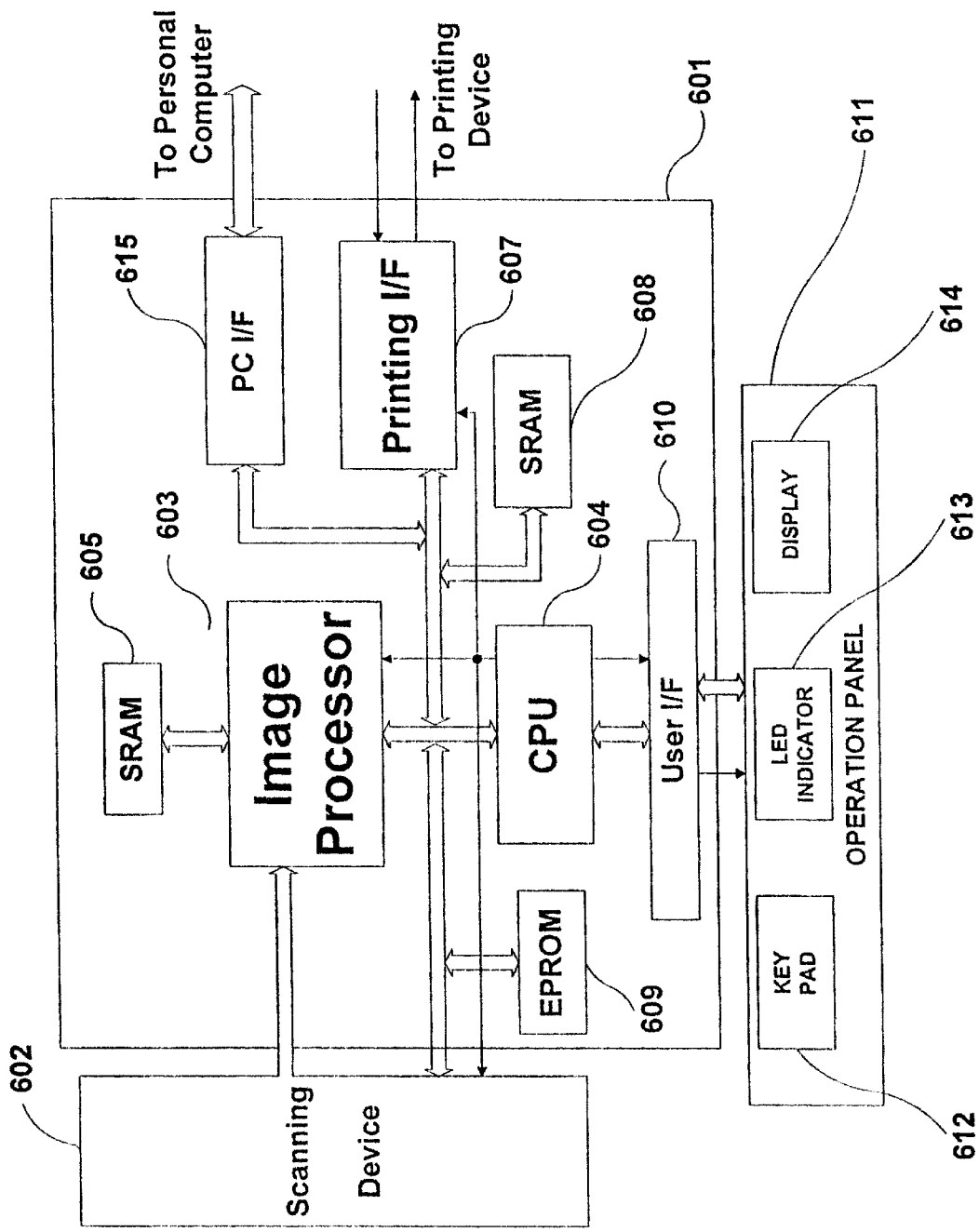
FIG. 6 shows the block diagram of the present invention.

FIG. 6 shows the block diagram 601 of the system. The scanned information from the scanning device 602 is controlled by a central processing unit 602. The image processor 603 processes the scanned information while in a Image Processing Mode according to the selection of the operation panel 611. An image storage device 605 stores the processed and pre-processed information. The interface 607 is connected to a printer or printer engine through a video interface according to handshaking command and status, synchronization signals such as Page Synchronization, and Line Synchronization synchronize with the video data for printout. An operation panel 611 includes a Display 614 for display of magnification/reduction ratio and page number, LED 613 for display of operating mode and printer status, etc. The key pad 612 inputs the operating mode, the magnification/reduction ratio, page number, etc. A central processing unit 604 constitutes the control center, through which the printing interface 607 handshakes with the exter-nal printer, and the operation panel 611 displays the status, The image processor 603 controls the schronization and operation of the scanning, processing and printing steps.

In the scanning unit, the original document is placed on a glass platen. An image is projected or a sheet of original image is scanned by means of an exposure lamp, a lens and an image sensor capable of reading a line image (e.g. a CCD sensor). Various kinds of image processing information is read by the scanning device as controlled by a controller. The computer interface may be a SCSI (Small Computer System Interface) interface, parallel interface, etc. The resolution of the scanning unit is e.g. 300 dots per inch in the main scanning direction and a variable resolution in the sub-scanning direction, e.g. ranging from 75 lines per inch through 600 lines per inch.

Referring to FIG. 6, the image processing system 601 consists of a scanning device 602, an image processing unit 603, a printing interface 607, a central processing unit (CPU) 604, operation panel 611, a program storage memory 609, a working memory 608 for the CPU, and an image memory 605.

The central processing unit 604 controls the scanning area, the scanning mode, and the scanning speed of the scanner. When the image signal is transmitted to the image processor, the image processor proceeds to process the signal according to the instruction of the control panel 611. The processed image as controlled by the image processing unit 603, can control the feeding speed of the scanned image, the synchronization with the printer, or selecting to transmit the processed signal to the computer through the computer interface 615.

The control and synchronization of the entire system including the scanner, the image processor 603 and external printer . . . etc. are controlled by the central processing unit 604. the control modes, the table of contants and mathematical formulas are stored in an EPROM or masked ROM 609. The control panel 611 contains different input keys 612 for user to select the necessary modes, indicator 614 and light emitting diodes 613 to display the operating modes of the printer and operation of the program. The indicator 614 has many display areas and can be displayed with liquid crystal or similar displays. The display can display the input numbers as keyed on the operating panel image processing mode and density control, or can display the reproduced numerical information. The light emitting diode 613 indicates the current states and conditions of the system. The processed image can be transmitted to the computer or transmitted to the printer for output. The image scanned by the scanner 602 can be sent to the computer. The material to be printed can be sent to the printer directly with or without being processed by the image processor 603.

Figure 7:
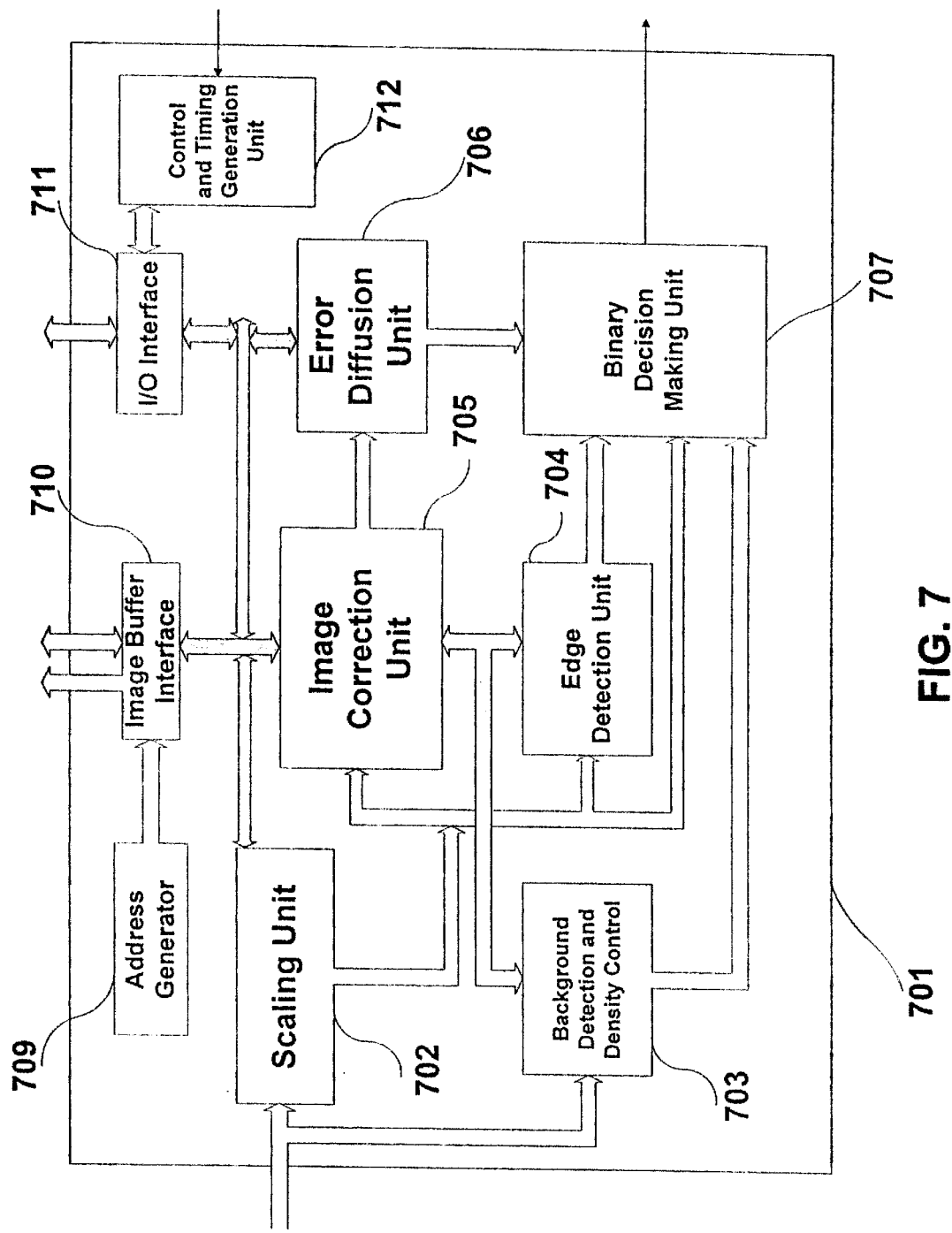
FIG. 7 shows the construction of the image processor.

Referring to FIG. 7, a typical construction of the image processor 701, corresponding to the block 603 in FIG. 6, adapted to process inputting multiple image signal from external scanning unit and outputting processed video image signal to external printing unit. As shown in FIG. 7, the scaling unit 702 under the control of external CPU enlarges or reduces the size of images of the respective sizes of originals with reference to the size of a record sheet so that the images of the originals can be accommodated in the recording areas of the sheet. The image data processed in the scaling unit are stored in the storage memory means through memory control and interface unit 710 and can be retrieved from storage memory means for image processing next line.

Referring to FIG. 7, a background detection and density control unit 703 is provided for automatically detecting the density of document background so as to provide a background threshold for image processing. To achieve the dynamic background detection, according to the present invention, is to provide a digital peak hold circuit which holds the peak threshold in a count-up/down counter. The counter counts up when the input image signal is greater than the peak threshold, and counts down when the consecutive eight input image signals is lower than the peak threshold. The peak threshold may be either a fixed background threshold selected from operation panel or the dynamic background threshold generated from the digital peak hold circuit. The final background threshold is determined in accordance with the selection of density control level and the peak threshold value.

Referring to FIG. 7, an image correction unit 705 is provided to adjust the input scanning gamma curve to output printing gamma curve, so as to obtain the best printing quality and result. The image correction curve can be changed by the information from the operation panel.

Referring to FIG. 7, an edge detection unit 704 is provided to adopt a 3×3 window to detect the existence of an edge. An edge threshold is assigned by the information from the operation panel to detect if an edge which is currently covered by the 3×3 window exists. If an edge is present, the edge detected signal is generated to the "binary output decision making unit" for further image processing. A detailed discussion of this separation will be given below.

Referring to FIG. 7, the address generator unit 709 and memory control & interface unit 710, are provided for external storage memory access. The address generator unit 709 generates the image correction address, 3×3 window address, CPU address, and error diffusion address. The addresses are multiplexed to provide a specified address in specified memory phase. The image processor handles different process and fetches or stores specified data from specified memory address in different memory phases.

Referring to FIG. 7, an error diffusion unit 706 is provided to perform "halftone image processing", so that a user can select either the error diffusion or dither method to process the image. If the error diffusion method is selected, the image signal from the scanning device 602 is fed to the scaling unit 702 and the density control unit 703, which are then combined with the output from the image correction unit 705, edge detection unit 704 and error diffusion unit and fed simultaneously to the binary output decision making unit 707 to obtain the error diffusion effect. If the dither method is selected, the error diffusion unit 706 only furnish the "dither table" and does not have the error diffusion function. Then the binary output decision making unit 707 outputs a dithered image.

The advantages of the error diffusion method is that the resolution is maintained in its best condition and is free from unwanted textures. There are some disadvantages using error diffusion method, such as: white background is disturbed by snake-like noise, the printed image is too dark to distinguish the details, and the printed text exhibits a coarse edge. In order to improve the above disadvantages, binary output decision making unit is introduced to remove background snake-like noise, and enhance the edge of the text. An overly dark printing image is improved by an image correction curve.

Different combinations of coefficients can produce printing effects. These coefficients include those for: background and density control unit 703, edge detection and intensifying unit 704, and image correction unit 705. An I/O interface unit 711 between the central processing unit CPU and the output/input serves as the interface for the central processing unit and the interface for the temporary storage of output/input. A time sequence and control unit 712 provides the clock pulses and controls the timing signals. The basic clock is supplied from an external crystal or oscillator. The clock and control generator 712 supplies not only the timing clocks and the control signals for the different internal units, but also output timing pulses for the entire system.

Figure 8:
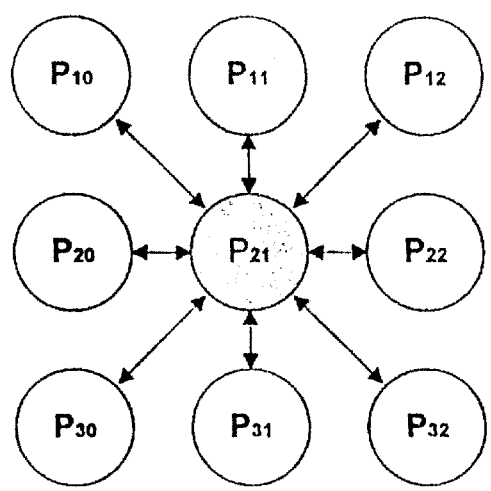
FIG. 8 shows a 3×3 window to detect the existence of an edge.

Referring to FIG. 8, the 3*3 window is constructed with the current-processing pixel P21, as the central entity and the eight adjacent pixels P10, P11, P12, P20, P22, P30, P31, P32 surrounding the central pixel P21, as the neighborhood entities. The absolute difference between the grey levels of the central pixel and one of the neighborhood pixels, which is greater than the edge threshold, indicates that an edge exists between the central pixel and one of the adjacent pixels.

Figure 9:
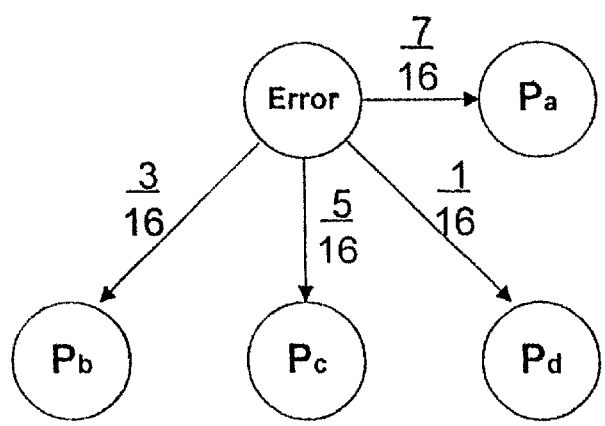
FIG. 9 shows an error diffusion algorithm.

The error diffusion algorithm is shown in FIG. 9. The error is calculated by the original image signal A[i,j] subtracts the video image data B[i,j] which is determined by the binary output decision making unit 707, which distributes the error by multiplying a factor of $7/16$, $3/16$, $5/16$, $1/16$ respectively to the surrounding pixels of Pa, Pb, Pc, Pd.

Figure 10:
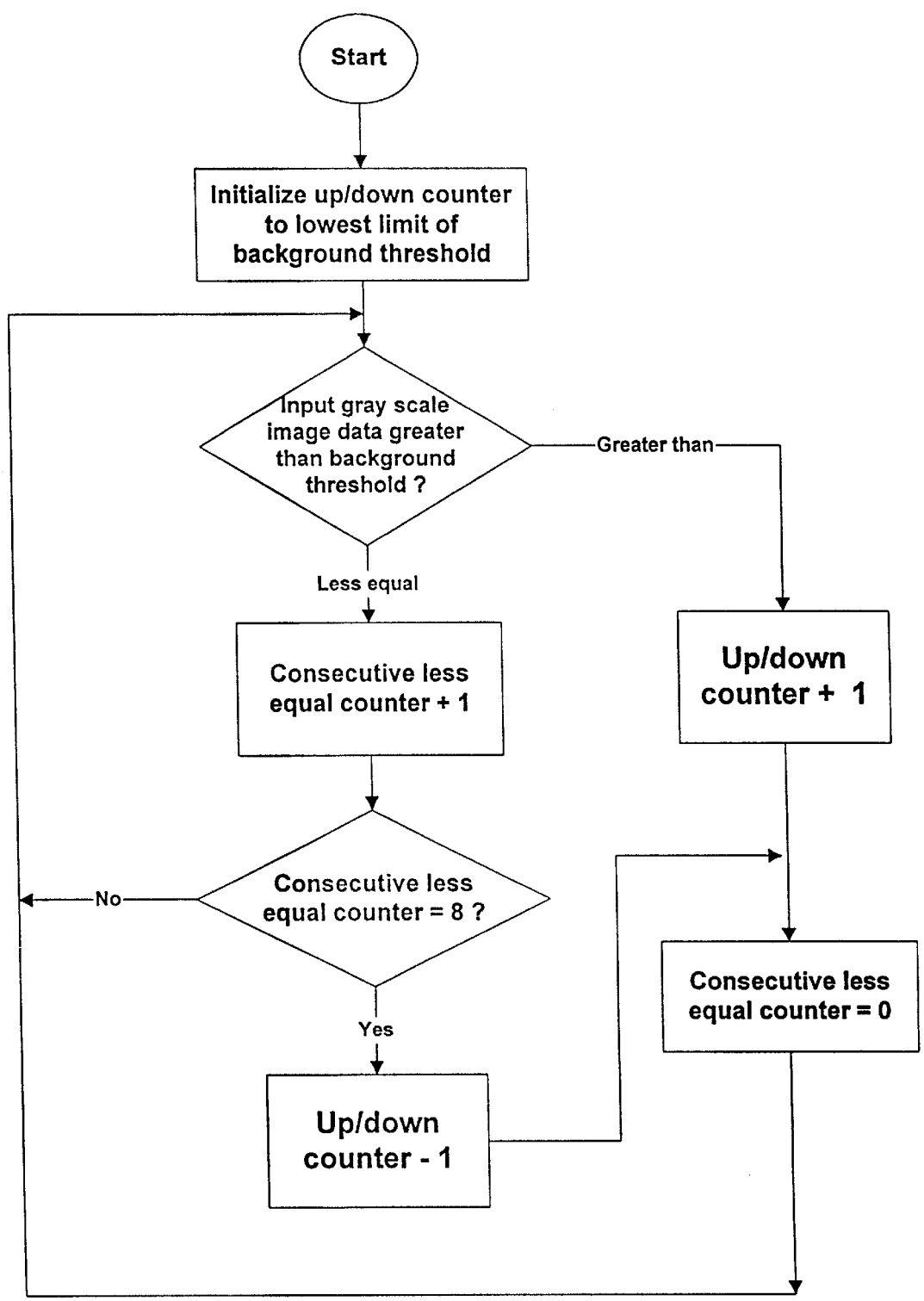
FIG. 10 shows the flow diagram for automatic background detection.

Referring to FIG. 10, automatic background detection is based on using the peak value of certain area as a dynamic reference value. This value is transmitted to the decision making unit for further treatment to subtract from the picture content, so that the details in the background area can be read.

Figure 11A:
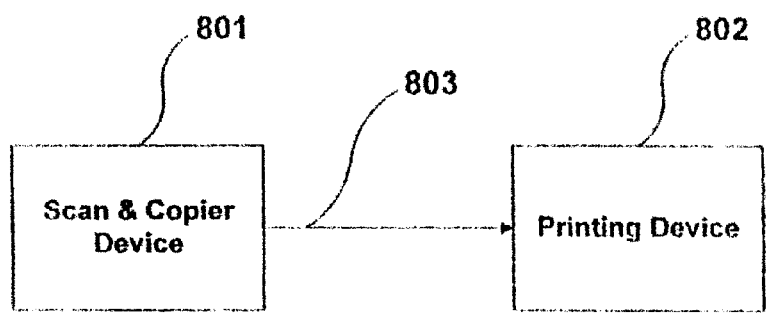
FIG. 11A shows the connection of the present invention to the printing device through a video interface.

FIG. 11A shows the connection of the printing device to the present invention through a "video interface"803.

Figure 11B:
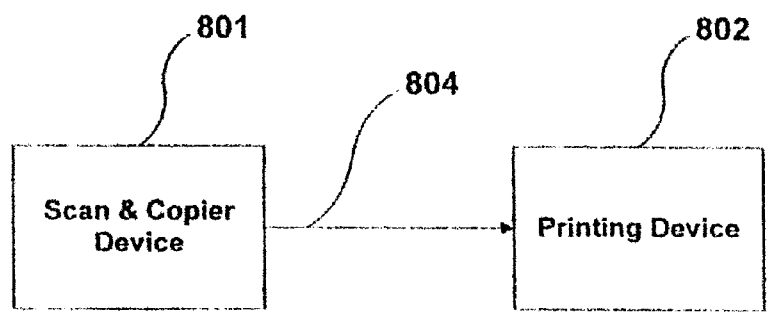
FIG. 11B shows the connection of the present invention to the printing device through a parallel port.

FIG. 11B shows the connection of the printing device to the present invention through a "parallel port"804.

Figure 11C:
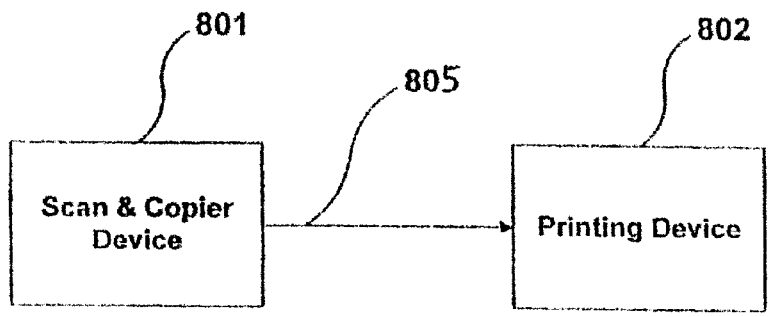
FIG. 11C shows the connection of the present invention to the printing device through a universal serial port.

FIG. 11C shows the connection of the printing device to the present invention through a "universal serial bus"805.

In summary, a scanning device can be connected to an external printing device through this invention to achieve high speed, high quality printout. This invention solves not only the problem of slow speed, poor quality of conventional copier, but also the problem of high equipment cost, high maintenance cost, large space and high energy consumption.

Another feature of the present invention is the transformation of output information into image information which is then transferred to the printer for printout. This feature solves the problem of inferior and slow output quality of the computer output.

The foregoing description merely discloses the preferred embodiment as an example. This invention is by no means limited to this embodiment. Any equivalent techniques to achieve the same results are all within the scope of this invention.

What is claimed is:

1. An image processing system to receive and process scanned information from a scanner, comprising:

a central processing unit to control the scanning of said scanner and the transmission of said scanned information, an image processor dedicated to process said scanned image information in terms of features from a group consisting of scaling, density control, background detection, and edge detection, error diffusion;

an image storage device connected only to said image processor to store any pre-processed and processed image information, wherein said pre-processed and said processed image information can be selected between storing in a computer and sending to a printer for printout.

2. An image processing system as described in claim 1, further comprising an operation panel connected to said central processing unit for a user to select processing mode, assign copy count and copy ratio.

3. An image processing system as described in claim 1, wherein said image processor comprises:
- address generator with an interface unit for access to an external memory,
- provision for halftone processing to select between error diffusion and dither method in printing, and
- a timing control unit for generating timing pulses and timing sequence.

4. An image processing system as described in claim 1, wherein said image processor further comprising an enlargement/reduction function.

5. An image processing system as described in claim 1, wherein said image processor further comprising a background detection and density control unit to automatically detect the background and density of the document being scanned.

6. An image processing system as described in claim 1, wherein said image processor further comprising an image correction unit to correct the image after processing to obtain the best reproduction.

7. An image processing system as described in claim 1, wherein said image processor further comprising an edge detection unit for detecting the edge of said image to emphasize and smooth out the ragged edge of said image.

8. An image processing system as described in claim 1, further comprising a printing interface.

9. An image processing system as described in claim 8, wherein said interface is a video interface.

10. An image processing system as described in claim 8, wherein said printing interface is a parallel interface.

11. An image processing system as described in claim 8, wherein said printing interface is a universal serial interface.

12. An image processing system as described in claim 1, further comprising a computer interface connected to said central processing unit, which controls the transmission of said image information stored in said image storage device.

13. An image processing system which processes scanned image data from a scanner for outputting to a printer, comprising:
- a central processing unit to control the scanning of said scanner and the transmission of said scanned data,
- an image processor controlled by said CPU and connected to said central processing unit to process said scanned data from said central processing unit in terms of features from a group consisting of scaling, density control, background detection edge detection and error diffusion;
- an image memory connected only to said image processor to store processed and pre-processed data from said image processor for outputting to said printer.

14. An image processing system as described in claim 13, further comprising a printing interface.

15. An image processing system as described in claim 14, wherein said printing interface refers to video interface.

16. An image processing system as described in claim 14, wherein said printing interface is a parallel interface.

17. An image processing system as described in claim 14, wherein said printing interface is a universal serial interface.

18. An image processing system which processes data from a computer, comprising:
- a central processing unit which controls the transmission of image data received from said computer through an interface,
- a dedicated image processor connected to said central processing unit for receiving control instructions from said central processing unit to process the data received from said computer in terms of features from a group consisting of scaling, density control, background detection, edge detection and error diffusion;
- an image memory connected only to said image processor to store the image data before and after processing by said image processor for use in outputting the image data to a printing device.

19. An image processing system as described in claim 18, wherein said image processor further comprising a printing interface.

20. An image processing system as described in claim 19, wherein said printing interface is a video interface.

21. An image processing system as described in claim 19, wherein said printing interface is parallel interface.

22. An image processing system as described in claim 19, wherein said printing interface is a univeral serial interface.

23. An image printing system, comprising:
- a scanner to scan a document;
- a central processing unit to control the scanning and transmission of the scanned information from said scanner;
- an image processor connected to said central processing unit and processing the scanned image data based on instructions from central processing unit;
- an image memory connected to said image processor to store data before and after said scanned information to be processed; and
- printing interface connected to said central processing unit and for outputting said processed image data to an external printing device based on a user's selection.

* * * * *